(12) United States Patent
Albert et al.

(10) Patent No.: US 9,776,287 B2
(45) Date of Patent: Oct. 3, 2017

(54) DISASSEMBLY METHOD FOR A GAS TURBINE

(71) Applicant: LUFTHANSA TECHNIK AG, Hamburg (DE)

(72) Inventors: Rainer Albert, Hamburg (DE); Tanja Pinkowsky, Hamburg (DE); Andina Hoehn, Halstenbek (DE); Dennis Bobsien, Quickborn (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 128 days.

(21) Appl. No.: 14/727,482

(22) Filed: Jun. 1, 2015

(65) Prior Publication Data

US 2015/0343573 A1   Dec. 3, 2015

(30) Foreign Application Priority Data

May 30, 2014   (DE) .......................... 10 2014 210 297

(51) Int. Cl.
*B23P 6/00*   (2006.01)
*F16C 43/00*   (2006.01)
(Continued)

(52) U.S. Cl.
CPC ............ *B23P 6/002* (2013.01); *F01D 25/285* (2013.01); *F16C 43/00* (2013.01); *G01P 21/02* (2013.01);
(Continued)

(58) Field of Classification Search
CPC ........ B23P 6/002; G01P 21/02; F01D 25/285; F01D 17/06; F16C 43/00;
(Continued)

(56) References Cited

U.S. PATENT DOCUMENTS

| | | | | |
|---|---|---|---|---|
| 5,205,513 A | * | 4/1993 | Schilling | ................ B64D 27/18 244/54 |
| 9,188,007 B2 | * | 11/2015 | Edwards | ................. F01D 25/16 |

(Continued)

FOREIGN PATENT DOCUMENTS

| | | |
|---|---|---|
| DE | 196 43 336 A1 | 10/1996 |
| DE | 10 2007 055 239 A1 | 5/2009 |

(Continued)

OTHER PUBLICATIONS

"Futterrohre—UGA System-Technik", May 30, 2013, XP055231772, accessed from: URL: https://web.archive.org/web/20130530105427/http://www.uga.eu/de/produkte/futterrohre/fu/.

(Continued)

*Primary Examiner* — John C Hong
(74) *Attorney, Agent, or Firm* — Saliwanchik, Lloyd & Eisenschenk (57) ABSTRACT

Method for replacing, inspecting, and/or repairing components in front bearing region of gas turbine, the gas turbine having at least one fan module, housing, low-pressure system, and high-pressure system, the low-pressure system having low-pressure compressor, low-pressure turbine, connecting shaft, stub shaft, and an N1 shaft connected to the low-pressure compressor via the stub shaft and the connecting shaft, the connecting shaft supported in the housing via first bearing unit, and the stub shaft supported in the housing via second bearing unit, the method including dismounting the fan module, fixing the N1 shaft in an axial direction relative to the housing using fixing device, and dismounting the stub shaft using guide device, the orientation of which relative to the gas turbine in at least one spatial direction is determined by a component of the remaining gas turbine, this taking place after fixing the N1 shaft and after dismounting the fan module.

20 Claims, 5 Drawing Sheets

(51) Int. Cl.
   *F01D 25/28* (2006.01)
   *G01P 21/02* (2006.01)
   *F01D 17/06* (2006.01)

(52) U.S. Cl.
   CPC .......... *F01D 17/06* (2013.01); *F05D 2230/68* (2013.01); *F05D 2230/70* (2013.01); *F05D 2230/72* (2013.01); *F05D 2230/80* (2013.01); *Y10T 29/497* (2015.01); *Y10T 29/49723* (2015.01); *Y10T 29/49732* (2015.01); *Y10T 29/53* (2015.01)

(58) Field of Classification Search
   CPC ......... Y10T 29/49723; Y10T 29/49732; Y10T 29/53; Y10T 29/497; F05D 2230/72; F05D 2230/70; F05D 2230/68; F05D 2230/80
   See application file for complete search history.

(56) References Cited

U.S. PATENT DOCUMENTS

2009/0288291 A1* 11/2009 Ziekow ................ B23P 19/022
                                                              29/700
   2012/0263578 A1   10/2012 Davis et al.
   2013/0011241 A1    1/2013 Skaustein et al.
   2013/0199206 A1    8/2013 Cigal et al.
   2013/0315714 A1   11/2013 Müller

FOREIGN PATENT DOCUMENTS

EP       2 543 868 A2      1/2013
   GB       2 177 160 A       1/1987
   GB       2 320 527 A       6/1998
   WO    WO 2012/107248 A1    8/2012

OTHER PUBLICATIONS

International Search Report dated Dec. 14, 2015, for corresponding International Application No. PCT/EP2015/061091.
   "Casing Pipe—UGA System-Technik", May 30, 2013, XP055231772, accessed from: URL: https://web.archive.org/web/20130530105427/http://www.uga.eu/de/produkte/futterrohre/fu/.

* cited by examiner

Fig. 8

DISASSEMBLY METHOD FOR A GAS TURBINE

CROSS-REFERENCE TO RELATED APPLICATIONS

The present application claims priority to German Patent Application No. 10 2014 210 297.9, filed May 30, 2014, which is hereby incorporated by reference herein in its entirety, including any figures, tables, or drawings.

The invention relates to a disassembly method for a gas turbine having the features of the preamble of Embodiment 1 described in the Embodiments section. The invention further relates to a fixing device, a guide device and a calibration device.

Gas turbines which are known from the prior art, in particular gas turbines for aircraft, referred to as engines in the following, are known as twin-shaft engines. One example of a twin-shaft engine is the V2500-A5-type engine from International Aero Engines (IAE). An inner N1 (low-pressure) shaft is used here to transmit torque between the low-pressure turbine and the low-pressure compressor; an N2 (high-pressure) shaft which coaxially surrounds the N1 shaft transmits torque from a high-pressure turbine to a high-pressure compressor. In the front region of the engine, the N1 shaft is connected for conjoint rotation to a low-pressure compressor, it also being possible for the connection for conjoint rotation to be established via intermediate elements. Said portion of the low-pressure system forms an intermediate space together with the gas turbine housing. In particular the region in which the front part of the N1 shaft is mounted relative to the gas turbine housing is only accessible for maintenance work with difficulty; this region is referred to as the front bearing region or "front bearing compartment", or "no. 3 bearing, internal gearbox and support assemblies". Owing to the wear mechanisms occurring during operation, the components in the front bearing region have to undergo certain maintenance work. Maintenance work which has to be carried out in regions which are difficult to access, for example the front bearing region, has a particularly high level of complexity. Scheduled maintenance work can be carried out in a workshop during an overhaul of the engine. If problems occur in an unforeseen manner with components which are only accessible via the front bearing space, then at least sub-systems of the gas turbine have to be dismounted in a complex manner in order to gain access to the front bearing region. The consequences of this are a high level of work complexity, long turnaround times and high resulting costs owing to flight delays and cancellations.

If maintenance work, such as inspections or the replacement of components, has to be carried out in the front bearing region, then this is performed in accordance with a known, predefined process.

This known process provides that the engine first has to be removed from the wing of the aircraft, in order to then be transported to a workshop. The known method shall be briefly outlined using FIG. 1 and FIG. 2.

Figure 1:
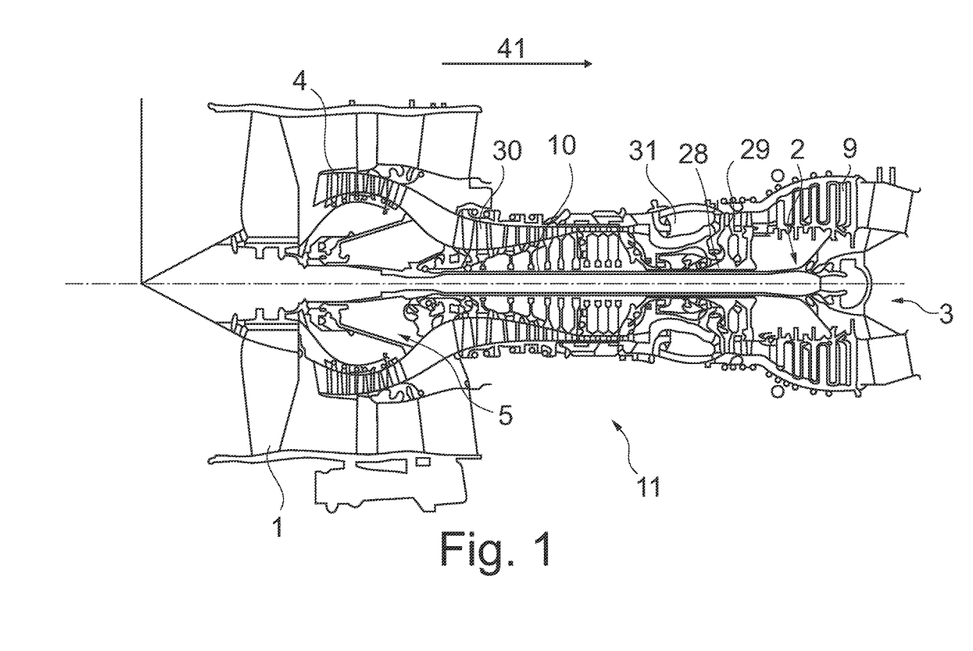
FIG. 1 is a schematic view of the structure of an aircraft engine.
Figure 2:
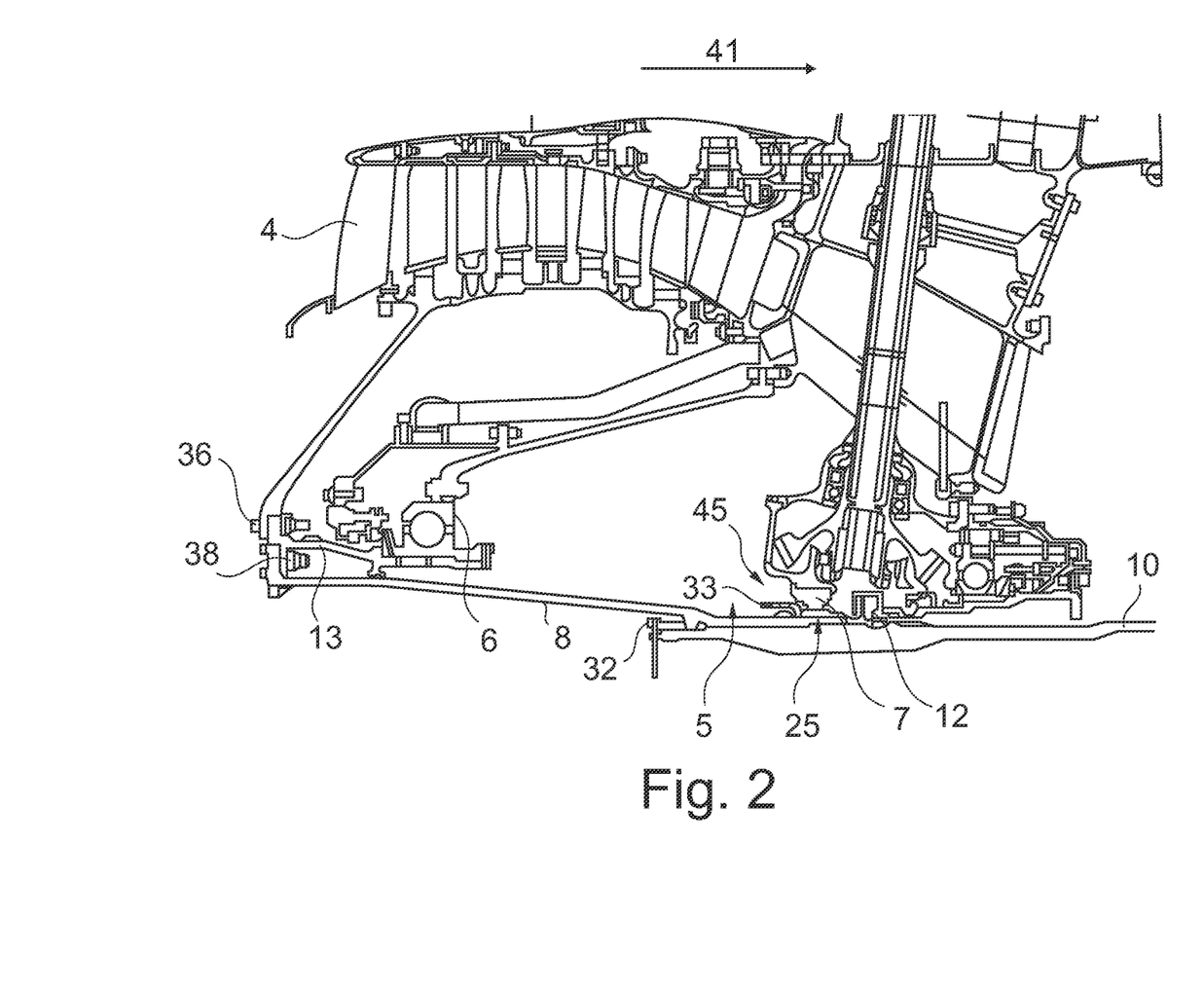
FIG. 2 is a schematic view of the structure of a front portion of an aircraft engine.

In a first step all the systems required for further disassembly, such as pipelines, cables and retaining plates, and apparatuses on the core engine, are removed in the workshop. In a second step, a low-pressure turbine module 2 and an exhaust gas housing 3, which is known as an exhaust case, are dismounted. The low-pressure turbine module 2 comprises the low-pressure turbine 9 and the N1 shaft 10. In a third step, a fan module 1 is then removed. In a fourth step, the low-pressure compressor 4 is removed. In a further step, in order to gain access to the front bearing region 5 for maintenance work, a first and second bearing unit 6 and 7 together with a stub shaft 8, this being the low-pressure stub shaft, are pulled forwards out of the engine. The stub shaft 8 together with the first and second bearing units 6 and 7 are separated from the gas turbine 11 at the point of a hydraulic seal 12. By using a device which is specially provided for this purpose, an appropriate force is applied in the axial direction, so that the first and second bearing units 6 and 7 together with the stub shaft 8 can be pushed or pulled forwards out of the gas turbine 11. The special device makes it necessary for the N1 shaft 10 to be removed, since the device engages in the inner region of the hydraulic seal 12, which is usually connected to the N1 shaft 10 by an interference fit. Using this known disassembly method allows the front bearing region 5 to be accessed and various types of maintenance work to be carried out in said region. Typical types of maintenance work which can be carried out in this region are, for example, replacing a speed sensor, which is known as the "speed probe", or a position transmitter, which is known as the "trim balance probe", or the cable harness which leads from the inside to the outside and is known as the "electrical harness". After the maintenance work has been carried out, the assembly process then follows and is essentially the disassembly process in reverse.

The procedure which has been described thus far and is known from the prior art is very time-consuming, since all apparatuses, pipes and cables which are on the outer housing wall have to be removed in order for the described disassembly method to be carried out. The engine thus has to be disassembled to a great extent in order to gain access to the front bearing region. In addition, it is disadvantageous that, when using the described method, it is not possible to gain access to the front bearing region while an engine is still suspended from the aerofoil of the aircraft, that is to say "on-wing".

The patent application DE 196 43 336 A1 describes a method with which an end-face bearing housing or a low-pressure-compressor shaft part can be dismounted without the engine having to be removed from the aerofoil. For this purpose, the N1 shaft of the engine is fixed both in the axial direction and in the rotational direction. The end-face bearing housing or the low-pressure-compressor shaft part is then attached to a lifting tool, so that the components removed are supported during the forward movement out of the engine. The lifting device proposed in DE 196 43 336 A1 is not connected to the gas turbine, but is instead held in position by a crane hook, for example. This solution is disadvantageous in that support can be only provided in the front, directly accessible region of the engine, that is the region where the lifting tool is connected to the crane hook. Components can then only be removed from the engine without being damaged if they are arranged in a front region of the engine in which they can be sufficiently supported by the lifting device during the disassembly process. A further drawback is that the lifting device has to be adjusted relative to the engine, in particular vertically, in order to make it possible to install and remove the components without them being damaged.

The patent application DE 10 2011 009 770 A1 discloses a method for replacing a sealing plate or a bearing unit. In this method, an engine sub-unit comprising a core engine and a low-pressure turbine is dismounted from the engine. In a further step, the sealing plate on the engine sub-unit can then be replaced. When the engine sub-unit has been removed, a bearing unit which supports the N2 shaft can, alternatively or additionally, also be replaced.

One object of the invention is to provide a disassembly method with which the front bearing region can be made accessible with reduced complexity in order for maintenance work to be carried out. A further object of the invention is to provide a fixing device, a guide device and a calibration device for carrying out the disassembly method in a simplified manner.

Embodiments of the invention achieve one or both of these objects using the features of the independent Embodiments described in the Embodiments section. Further preferred embodiments of the invention are found in the dependent Embodiments described in the Embodiments section, the drawings and the associated description.

According to the embodiments of the invention, in order to achieve one or both of these objects a disassembly method is proposed which comprises at least the steps of:
a) dismounting the fan module, and
b) fixing the N1 shaft in an axial direction relative to the gas turbine housing using a fixing device, and
c) dismounting the stub shaft using a guide device, the orientation of which relative to the gas turbine in at least one spatial direction is determined by a component of the remaining gas turbine, this taking place after the N1 shaft has been fixed and after the fan module has been dismounted.

By using the guide device, the stub shaft can be pulled forwards out of the engine in a predetermined dismounting movement. An advantage of this method is that the orientation of the guide device in at least one spatial direction is determined by a component of the remaining gas turbine. "A component of the remaining gas turbine" is understood to mean a component which remains in the gas turbine during the disassembly method. Preferably, the guide device is supported by a component of the gas turbine which is axially behind the directly accessible front region of the gas turbine; preferably, this support is provided by the N1 shaft. More preferably, the guide device is also supported in a directly accessible front region of the gas turbine. This is a particular advantage compared with the method known from DE 196 43 336 A1. The guide device is supported at two axially spaced points by an additional support point of the guide device within the gas turbine, said support point being axially offset towards the rear. Compared with a lifting device, the guide device can thus reliably guide and support the components to be removed during the entire axial dismounting movement. The complexity of disassembly and the risk of damage during the installation and removal of the stub shaft can thus be reduced. A special lifting device is therefore not required, and as a result disassembly can also be carried out at locations at which a lifting device is not available.

Using the method according to an embodiment the invention, the low-pressure turbine module which includes the low-pressure turbine and the N1 shaft can remain in the gas turbine during the disassembly method. Only the fan module and the stub shaft have to be removed from the front region of the engine in order to gain access to the front bearing region. By fixing the N1 shaft in the axial direction, the stub shaft can be pulled forwards out of the gas turbine and the connection between the stub shaft and the N1 shaft is released. In order to release the connection between the stub shaft and the N1 shaft, high axial forces are required which could lead to damage to the engine or to the low-pressure turbine module if the low-pressure turbine module is not fixed. Since it is no longer necessary to remove the low-pressure turbine module, the method according to the invention may result in a significant saving in terms of time and cost. Furthermore, the proposed method reduces the extent of disassembly to such a degree that it can be carried out "on wing".

Preferably, the method step b) comprises at least the method steps of:
d) dismounting an exhaust gas cone, and then
e) mounting a fixing device in the location of the exhaust gas cone, and then
f) connecting the N1 shaft to the fixing device.

The N1 shaft can be fixed particularly easily using the method steps d) to f), since only the exhaust gas cone has to be replaced by a fixing device. The fixing device is therefore attached at precisely the point at which the exhaust gas cone is arranged when mounted. Fixing the N1 shaft in the axial direction can thus be carried out on the discharge side of the gas turbine, on which the N1 shaft is easily accessible. Furthermore, the annular inner flange to which the exhaust gas cone is normally attached is an ideal attachment option for the fixing device. In addition, by axially fixing the N1 shaft in the discharge region of the gas turbine, work can be carried out in an unimpeded manner in the front bearing region, and thus preferably the stub shaft can be pulled or pushed forwards out of the gas turbine.

Preferably, the method step c) comprises at least the method steps of:
g) releasing all the connections between the stub shaft and the N1 shaft, and then
h) releasing all the connections between the stub shaft and a connecting shaft, and then
i) fitting a press device for axially separating the N1 shaft from the stub shaft, the press device being connected both to the N1 shaft and to the stub shaft, and then
j) introducing a force into the stub shaft and into the N1 shaft via the press device, which is oriented such that the stub shaft and the N1 shaft are moved apart in the axial direction.

Using the method steps g) to j) firstly results in the stub shaft being dismounted with low complexity. "Releasing all the connections" in method steps g) and h) is understood to mean releasing actively releasable connecting means, and preferably said actively releasable connecting means are formed by frictional or interlocking elements, for example by screw connections. On one hand, the stub shaft is connected for conjoint rotation to the connecting shaft via a first screw connection, it being possible to release said connection using a standard tool; on the other hand, the stub shaft is connected for conjoint rotation to the N1 shaft via a press connection and a second screw connection. The second screw connection can also be released using a standard tool. In order to release the press connection, a press device is used, which is preferably a hydraulic press. The press device is connected to the stub shaft and the N1 shaft in order to release the press connection. By actuating the press device, it exerts an axial force on the stub shaft and the N1 shaft, by means of which force the stub shaft is pushed forwards in the axial direction. By axially fixing the N1 shaft using the fixing device, the press device can be supported by the N1 shaft without any damage occurring. Preferably, releasing the press connection is assisted by cooling the N1 shaft, and more preferably by additionally heating the stub shaft.

It is further proposed that, as an additional method step k), the stub shaft is supported in the radial direction by the guide device during the axial forward dismounting movement. Supporting the stub shaft using a guide device is advantageous in that the stub shaft can be moved forwards out of the gas turbine with low complexity. By guiding the movement of the stub shaft, damage to the stub shaft itself and to adjacent gas turbine components can be prevented. In addition, there is the advantage that in the subsequent assembly method, the stub shaft is guided such that it can be moved into the desired position with low complexity.

Furthermore, it is advantageous for the guide device to be attached to a gas turbine housing of the low-pressure compressor. Preferably, the guide device is attached to the gas turbine housing in the region of the inlet. Attaching the guide device to the gas turbine has the advantage that relative movements between the guide device and the gas turbine can be prevented. This is advantageous in particular for engines which are mounted on the aerofoil, so that the disassembly method according to the invention can also be carried out "on wing". The guide device preferably comprises a retaining device and a guide pipe. By attaching the guide device to the gas turbine housing in the region of the inlet, the guide pipe can be positioned such that the stub shaft can be withdrawn forwards via the guide pipe. The stub shaft coaxially surrounds the guide pipe during the withdrawal process.

Preferably, in method step c) the stub shaft and the low-pressure compressor are dismounted. Owing to the additional dismounting of the low-pressure compressor, there is the option of gaining greater access and of thus carrying out additional maintenance work.

Preferably, in method step c) the first bearing unit and the connecting shaft are also dismounted, this taking place after the low-pressure compressor has been dismounted. By removing the low-pressure compressor and the first bearing unit, greater access can be provided to the front bearing region. This greater access makes it possible to install and remove the sensors located in the region of the second bearing unit, including the supports thereof. In particular, using this additional method step, access is gained to a pipe which guides cable lines to the sensors or the sensor system. In addition to the installation and removal of components, further inspections may also preferably be carried out owing to the greater access. Without using the method according to the invention, this greater access is only possible by disassembling the gas turbine to a high degree.

Furthermore, it is proposed that, following the method steps a) to c), an additional method step 1) is provided for replacing at least one sub-system of a sensor system. Preferably, a position transmitter, which is known as the "trim balance probe", or a speed sensor, which is known as the "speed probe", is replaced here.

Preferably, the method step 1) also includes the calibration of the sensor system, the sensor system substantially comprising a sensor and a clock generator, which is known as the "phonic wheel", the distance between a clock generator and a sensor head being measured, for the purposes of calibration, using a calibration device, and the measured distance then being accordingly adjusted. In the known method, the calibration is carried out using a calibration ring, which is known as the "dummy phonic wheel", the radially outwardly pointing outer surface of the calibration ring simulating the outer surface of the clock generator. The calibration ring which is known from the prior art can only be used when the N1 shaft and the second bearing unit have been removed. By using a calibration device which has been designed specifically for the method according to the invention, the speed sensor can be calibrated without the N1 shaft and the second bearing unit being removed.

Furthermore, it is proposed that the calibration device is arranged on the second bearing unit. The calibration device can be positioned by the second bearing unit such that the outer radius of the clock generator can be reliably simulated by an outer face of the calibration device. Preferably, for this purpose, the calibration device engages in the inner face of the second bearing unit so as to correspond to the shape thereof.

It is further proposed that in method step c), a second bearing unit is also dismounted. In this step, for example, the second bearing unit can be replaced or further maintenance work can be carried out which requires the second bearing unit to be dismounted.

According to embodiments of the invention, a fixing device is proposed for carrying out the disassembly method, said fixing device comprising a fixing rod for connecting the N1 shaft to the fixing device, and a centring plate for fixing the fixing rod, said plate being held in a defined position by a part of the gas turbine, wherein at least one attachment means is provided on the centring plate, said attachment means being capable of attaching the centring plate to the gas turbine in place of the exhaust gas cone. Using the fixing device, the N1 shaft can be fixed in the axial direction. Preferably, a Teflon layer is provided on the face of the centring plate, which face rests on the exhaust gas housing when mounted, in order to prevent damage to the gas turbine. Preferably, the Teflon layer is formed by an annular Teflon layer. Preferably, the attachment means is formed by holes, the holes preferably being distributed over the edge region of the centring plate, so that, when mounted, they correspond to the threaded holes which are used for attaching the exhaust gas cone.

According to embodiments of the invention, a guide device is proposed, which comprises a retaining device which can be connected to a front part of the gas turbine and a guide pipe, wherein, when mounted, the guide pipe is supported by a central hole in the retaining device, wherein the guide pipe comprises a thread at one end for connection to the N1 shaft. Preferably, the outer radius of the guide pipe is less than the inner radius of the stub shaft. Furthermore, the outer radius of the guide pipe is not significantly smaller than the inner radius of the stub shaft, so that the stub shaft can be pushed substantially without play via the guide pipe. The guide device also makes it possible to support the stub shaft in the radial direction when it is removed for gas turbines which are mounted on the aerofoil. It can thus be ensured that the bearing units of the gas turbine are relieved of stress during mounting and dismounting of the stub shaft. Furthermore, by securely guiding the stub shaft via the guide pipe, damage to the stub shaft is reliably prevented during mounting and dismounting.

A calibration device is further proposed, wherein the calibration device comprises a first and second outer face, wherein the radius of the first outer face corresponds to the radius of a clock generator of a sensor system, and the second outer face corresponds in shape to the inner face of the second bearing unit. The outer radius of the first face thus serves to simulate the outer face of the clock generator, in order for it to thus be possible to measure the distance between this face and the sensor head. Owing to the fact that the second outer face corresponds in shape to the inner face of the second bearing unit, the calibration device can be oriented by being fastened to the second bearing unit.

Preferably, the calibration device comprises an annular projection, wherein at least one gap is provided in the annular projection in order to make it easier to move the calibration device into and out of the calibration position. Owing to the installed N1 shaft, the calibration device has to be movable in the axial direction via the N1 shaft so that the calibration device can be moved into the calibration position. The calibration position is the position in which the first outer face of the calibration device adopts the position of the outer face of the installed clock generator. The gaps make it possible to move the calibration device past obstacles into the calibration position. The projection functions as a contact surface here. In the calibration position, the projection of the calibration device rests on the second bearing unit from the front and thus determines the calibration position in the axial direction.

BRIEF DESCRIPTION OF THE FIGURES

Embodiments of the invention is explained in the following on the basis of preferred embodiments, with reference to the accompanying drawings, in which.

FIG. 1 is a schematic view of a gas turbine 11 in the form of an aircraft engine. In the following, reference is therefore made to an engine and an engine housing. In this case, this is a twin-shaft engine, an N1 shaft 10 being coaxially surrounded by an N2 shaft 28. The N1 shaft 10 transmits rotational torque from a low-pressure turbine 9 to a fan module 1 and a low-pressure compressor 4. The N2 shaft 28 transmits rotational torque from a high-pressure turbine 29 to a high-pressure compressor 30 and is supported relative to an engine housing. A combustion chamber 31 is arranged between the high-pressure compressor 30 and the high-pressure turbine 29. The N1 shaft 10 and the low-pressure turbine 4 form a low-pressure turbine module 2. An air mass flows through the engine in the following order: fan module 1, low-pressure compressor 4, high-pressure compressor 30, combustion chamber 31, high-pressure turbine 29 and low-pressure turbine 9; this corresponds to the direction of an arrow 41 in FIG. 1 to FIG. 4. In the following, "towards the rear" means a movement in the direction of the arrow 41 and "towards the front" means a movement counter to the direction of the arrow 41. "Axial" and "radial" relate to the rotational axis of the engine, that is to say the N1 shaft 10.

FIG. 2 is a schematic view of the structure of a front portion of an aircraft engine. The N1 shaft 10 is connected for conjoint rotation to a stub shaft 8 via an interference fit, the connection between the N1 shaft 10 and the stub shaft 8 being secured in the axial direction by a screw connection 32. The screw connection 32 thus forms an actively releasable connecting means within the meaning of the invention. A portion of the N1 shaft 10 is coaxially surrounded by the stub shaft 8. The stub shaft 8 and thus also the N1 shaft 10 are supported relative to the engine housing via a second bearing unit 7. A sensor system 45 is provided in the region of the second bearing unit 7, a signal being generated by a clock generator 33 in accordance with the rotational frequency of the N1 shaft 10, which signal is detected via a sensor head. In accordance with the signal, the rotational speed of the N1 shaft 10 can thus be measured. The stub shaft 8 is in turn connected for conjoint rotation to the low-pressure compressor 4 via a connecting shaft 13. The connecting shaft 13 is supported in the engine housing via a first bearing unit 6. In this respect, the structure corresponds, for example, to the V2500-A5 engine type from IAE.

In the following, the method according to the invention will be described using the example of the V2500-A5 engine type from IAE. It should however be noted that the method according to the invention can also be used for other engine types, including the V2500-D5 engine type from IAE. Furthermore, it is also possible to use said method for other engine types and for stationary gas turbines having a corresponding structure.

Figure 3:
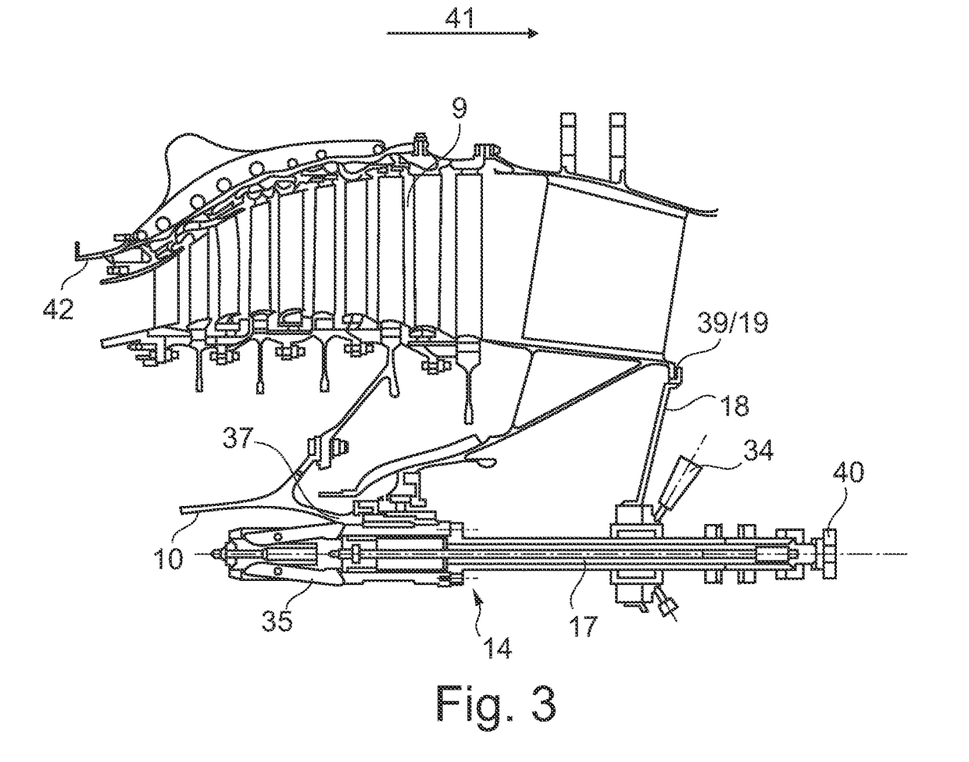
FIG. 3 is a schematic view of a fixing device.
Figure 4:
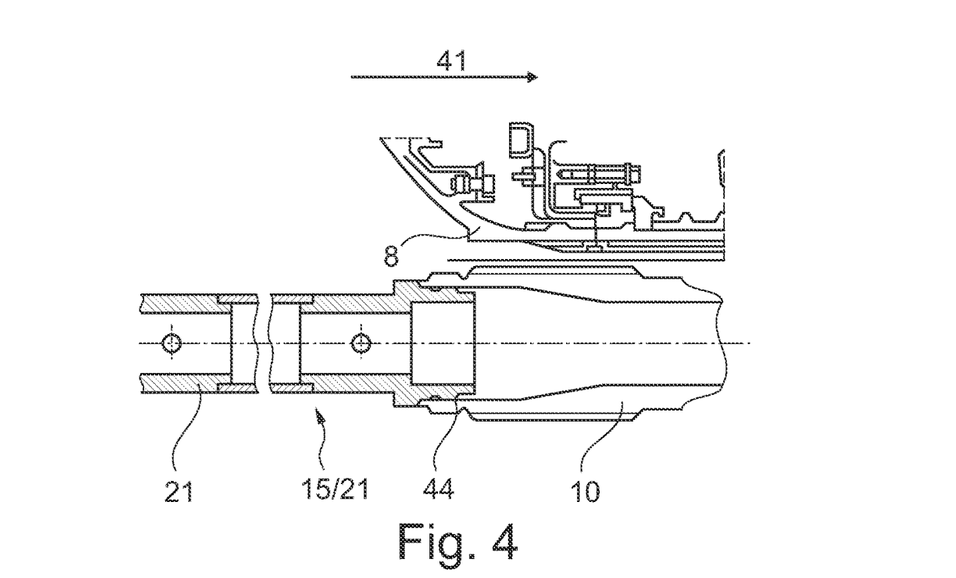
FIG. 4 shows a guide pipe of a guide device which is connected to an N1 shaft.

FIG. 1 and FIG. 2 show the engine in a mounted state in which it is ready for use, while FIG. 3 and FIG. 4 show the disassembly of the engine in various method steps. In order to carry out the method according to the invention, in a first step the fan module 1 is preferably dismounted.

In a second step, the low-pressure turbine 9 is preferably fixed. Preferably, a fixing device 14 according to the invention is used for this purpose (see FIG. 3).

FIG. 3 is a schematic view of the fixing device 14 according to the invention. The fixing device 14 includes a fixing rod 17, a centring plate 18, an expander 35, a handle 40 and a handwheel 34. The centring plate 18 is used to orient the fixing rod 17 relative to the N1 shaft such that the longitudinal axes thereof are substantially congruent. Furthermore, the centring plate 18 is used to fix the fixing device 14 in the axial direction relative to the engine housing. The handle 40 is connected to the expander 35 via a mechanical operative connection, so that said expander can be opened and closed. The expander 35 is in a closed position when it is expanded in the radial direction; in this state the expander 35 can establish a connection with an interlocking fit between an end portion 37 of the N1 shaft 10 and the fixing rod 17. The centring plate 18 comprises at least one attachment means 19, by means of which the centring plate 18 can be connected to an inner flange 39 of the exhaust gas housing 3. Preferably, a Teflon layer is provided on the face of the centring plate 18 which rests on the inner flange 39 when mounted. Therefore, damage to the inner flange 39 can be prevented; alternatively, however, other types of protective layer may also be used. Using the handwheel 34, the fixing rod 17 can be moved in the axial direction relative to the centring plate 18 and the N1 shaft 10 can thus be fixed.

In the second step of the disassembly method according to the invention, the exhaust gas cone is first dismounted from the inner flange 39 of the exhaust gas cone, whereby the N1 shaft 10 is made accessible in the rear engine region. By actuating the handle 40, the expander 35 is brought into the open position, so that it can be moved into the end portion 37 of the N1 shaft 10. Using the attachment means 19 on the centring plate 18, the fixing device 14 is fixed in the radial and axial direction relative to the engine housing. The handle 40 is then actuated and thus the expander 35 is brought into the closed position in which the fixing rod 17 is connected with an interlocking fit to the N1 shaft 10 such that axial movement of the N1 shaft 10 is prevented. By a rotational movement of the handwheel 34, the fixing rod 17 is now moved backwards in the axial direction such that the N1 shaft 10 is braced to the engine housing via the fixing device 14, such that the further disassembly steps can be carried out in the front region of the engine. The N1 shaft 10 is fixed in the axial direction in this state.

In a third step of the method according to the invention, either the stub shaft 8 and/or the low-pressure compressor 4 can now preferably be dismounted. In the following, alternatives are described by way of example in which the stub shaft 8 and the low-pressure compressor 4 are dismounted.

Preferably, the low-pressure compressor 4 is first dismounted, a connection 36 between the connecting shaft 13 and the low-pressure compressor 4 being released for this purpose. The stub shaft 8 is then dismounted, by it being pulled forwards out of the engine, the low-pressure turbine module 2 remaining installed; a connecting flange 42 of the low-pressure turbine housing thus does not need to be released. The connection 38 between the connecting shaft 13 and the stub shaft 8 has already been released during dismounting of the fan module 1; in this case, the connection 38 forms an actively releasable connecting means within the meaning of the connection. The stub shaft 8 and the connecting shaft 13 thus only remain interconnected by an interference fit in this method step. Here, the connecting shaft 13 remains in the engine and is retained by the first bearing unit 6; the connecting shaft 13 is then removed later. The stub shaft 8 is connected to the N1 shaft 10 by an interference fit. Preferably, the coaxially inner N1 shaft 10 is cooled in order to release the interference fit. Preferably, the coaxially outer stub shaft 8 may also be heated. In order to separate the stub shaft 8 from the N1 shaft 10 in the axial direction, a press device is used which is preferably formed by a hydraulic press. The hydraulic press is screwed via a thread to an internal thread of the N1 shaft 10 on a first side, which points in the direction of the arrow 41 when mounted, and is connected with an interlocking fit to the stub shaft 8 using a type of bayonet closure on the second side. When pressure is applied, the hydraulic press exerts a counteracting axial force on the N1 shaft 10 and on the stub shaft 8. Here, the hydraulic press can be supported on the N1 shaft 10 in the axial direction relative to a backward movement. This leads to the stub shaft 8 being moved forwards in the axial direction out of the engine until it has passed through the region of the interference fit. When this state is reached, the hydraulic pump is preferably dismounted again. Then, the stub shaft 8 is preferably completely dismounted using a guide device 15.

Figure 5:
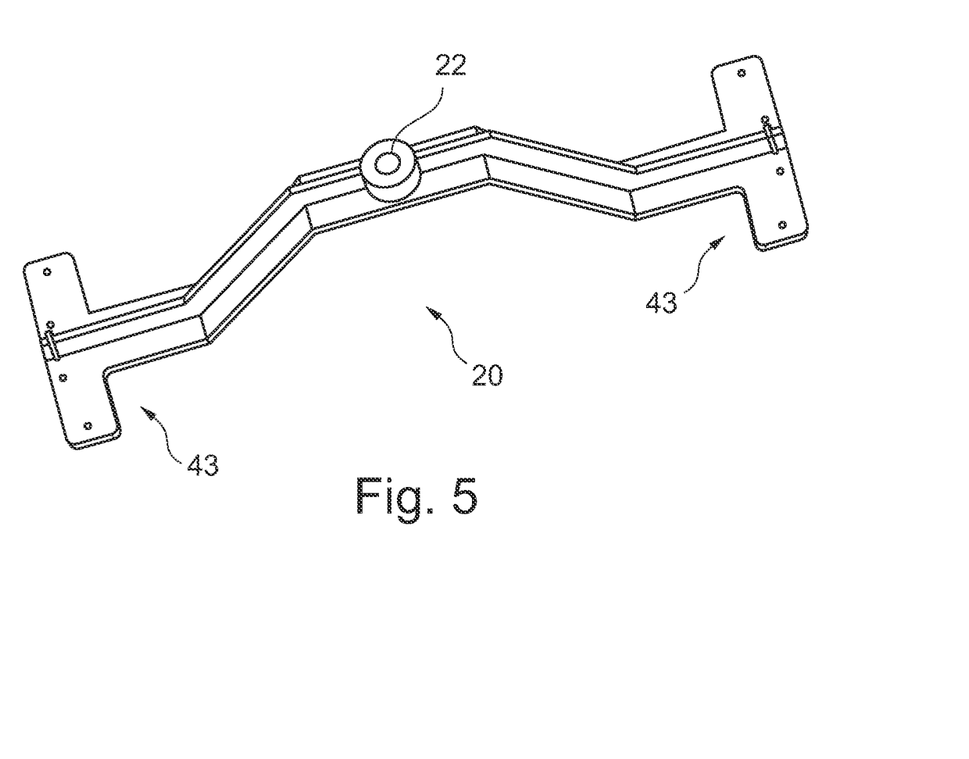
FIG. 5 is a perspective view of a retaining device.
Figure 6:
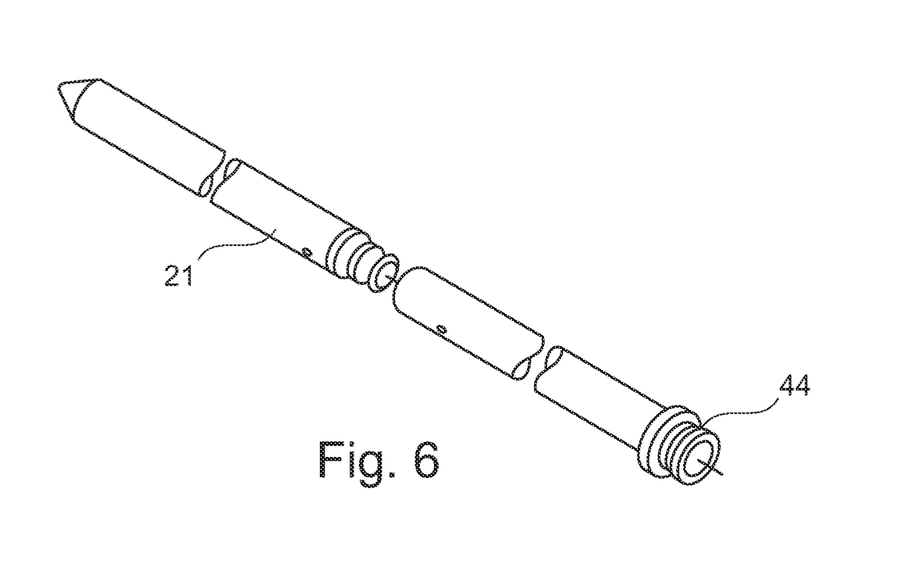
FIG. 6 is a perspective view of a guide pipe.

FIG. 4 to FIG. 6 show the components of the guide device 15. The guide device 15 comprises a guide pipe 21 (see FIG. 4 and FIG. 6), which, when mounted, is supported by a central hole 22 in a retaining device 20 (see FIG. 5). The retaining device 20 is preferably connected to the engine housing of a front engine region by two attachment portions 43. Preferably, the attachment portions 43 are connected to a region of the inlet. Preferably, the connection between the engine housing and the attachment portions 43 is established via a screw connection. The retaining device 20 is preferably shaped such that the region of the central hole 22 is outside the plane of the attachment portions 43. Preferably, the region of the central hole 22 is at a distance of 20 cm to 40 cm outside the plane of the attachment portions 43, more preferably approximately 30 cm. This results in it being possible for the stub shaft 8 to be easily pulled out of the engine, without movement through the retaining device being impeded. The guide pipe 21 has a diameter which is less than the inner diameter of the stub shaft 8. The diameter of the central hole 22 is such that it corresponds in form to the diameter of the guide pipe 21. A thread 44 is provided at one end of the guide pipe 21, which thread is designed such that it can be screwed to the internal thread of the N1 shaft 10. When mounted, the guide pipe 21 is thus supported in the radial direction at two axially spaced points.

According to embodiments of the method according to embodiments of the invention, the guide pipe 21 is guided through the stub shaft 8, and thus the end of the guide pipe 21 having the thread 44 is pushed from the front in the direction of the arrow 41 as far as the front end of the N1 shaft 10. The retaining device 20 is then positioned such that the guide pipe 21 is supported in the central hole 22 in the retaining device 20. In this position, the retaining device 20 is then attached to the front region of the engine by means of the attachment portions 43. Once the guide pipe 21 is in contact with the N1 shaft 10, the guide pipe 21 is set in rotation along its longitudinal axis such that the thread 44 can be screwed into the internal thread of the N1 shaft 10, and thus the N1 shaft 10 is connected to the guide pipe 21. The stub shaft 8 now coaxially surrounds the guide pipe 21, whereby the stub shaft 8 is supported in the radial direction when moving forwards out of the engine. Owing to the supportive effect of the guide pipe 21, damage to the stub shaft 8 can be prevented during the disassembly method and simple handling can be ensured. The guide pipe 21 is also used in an assembly method following the disassembly method in order to facilitate mounting of the stub shaft 8.

In a fourth step of the method according to the invention, the first bearing unit 6 and/or the second bearing unit 7, depending on what maintenance work is intended to be carried out, is preferably dismounted. Preferably, the proposed disassembly method is used for the replacement or inspection of at least one sensor system 45 in the region of the second bearing unit 7. The replacement of a speed indicator, which is known as the "speed probe", is given here as an example of the sensor system. Alternatively, for example, the position transmitter for detecting vibrations, which is known as the "trim balance probe", or the electrical cable, which is known as the "fan speed/trim balance probes harness", may also be replaced in the method according to the invention.

By removing the stub shaft 8, access is gained to a front bearing region 5 to such an extent that installation and removal of the speed sensor is possible without any problems. Using the method according to the invention, the cabling of the speed sensor is also accessible, whereby maintenance work can also be carried out on the cabling. After the speed sensor is installed, it must be calibrated. For this purpose, it is first necessary to determine the distance between the sensor head and the clock generator 33. A device known from the prior art for calibrating the speed sensor cannot be used in the disassembly method according to the invention, since the N1 shaft 10 would have to be removed for this purpose. A modified calibration device 16 is therefore used for calibrating the speed sensor.

Figure 7:
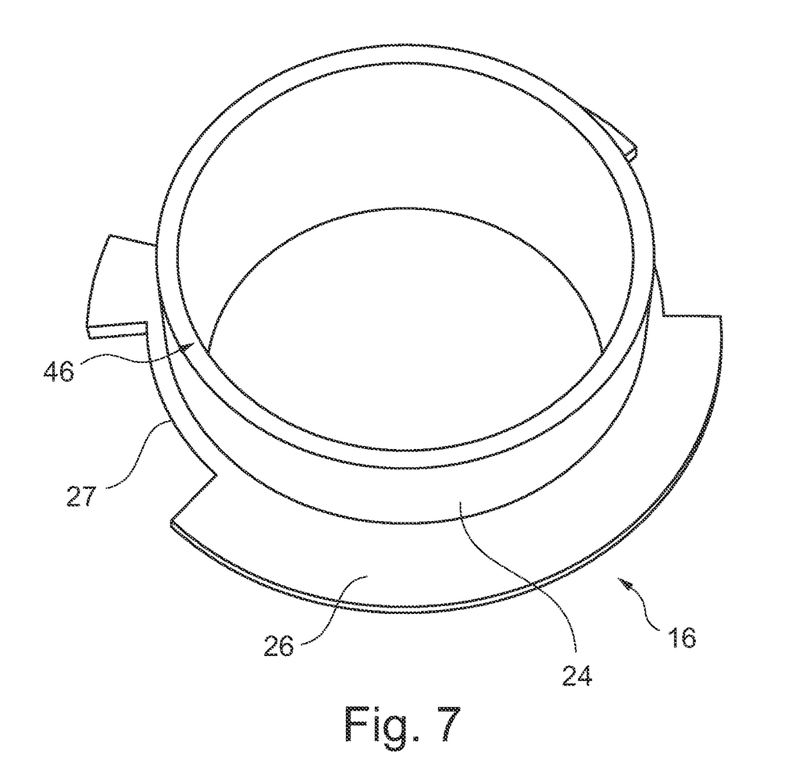
FIG. 7 is a first view of a calibration device.
Figure 8:
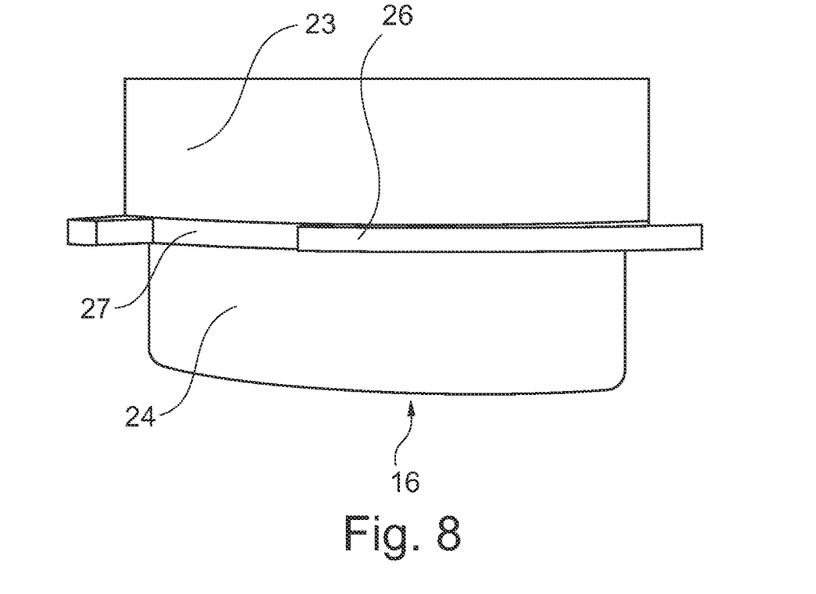
FIG. 8 is a second view of a calibration device.

The calibration device 16 is shown from various perspectives in FIG. 7 and FIG. 8 and includes an annular base element 46. The size of the inner radius of the calibration device 16 is such that the calibration device 16 can be moved into a calibration position via the N1 shaft 10. The calibration position is the position in which a first outer face 23 of the calibration device 16 adopts the position of the outer face of the installed clock generator 33. The calibration device 16 comprises a projection 26 which rests in the calibration position on the second bearing unit 7 as an abutment. The calibration position is thus determined in the axial direction by the projection 26. At least four gaps 27 are preferably provided in the projection 26 and are used to make it possible for the calibration device 16 to move in the axial direction past obstacles into the calibration position. A second outer face 24 is formed such that it is connected to the inner radius of the second bearing unit 7 in the calibration position so as to correspond to the shape thereof; the calibration position of the calibration device 16 is thus unambiguously determined.

In order to carry out embodiments of the method according to embodiments of the invention, the calibration device 16 is moved into the calibration position from the front via the N1 shaft 10. The calibration position is reached when the projection 26 is resting on the side face of the second bearing unit 7 which is oriented forwards; the second outer face 24 engages in the inner face 25 of the second bearing unit 7 so as to correspond to the shape thereof. In this position, the first outer face 23 simulates the outer face of the clock generator 33. The distance between the sensor head and the clock generator 33 can now be measured and then the speed sensor can be adjusted to the measured value. The calibration device 16 can then be removed again.

In the above, solely the disassembly of the engine has been described. The engine can be assembled in a similar manner to the disassembly in the reverse order.

EMBODIMENTS

Embodiment 1

Disassembly method for gas turbines (11) for replacing and/or inspecting and/or repairing components arranged in a front bearing region (5) of the gas turbine (11),
  the gas turbine (11) comprising at least one fan module (1), a gas turbine housing, a low-pressure system and a high-pressure system,
  the low-pressure system comprising a low-pressure compressor (4), a low-pressure turbine (9), a connecting shaft (13), a stub shaft (8) and an N1 shaft (10),
  the N1 shaft (10) being connected to the low-pressure compressor (4) via the stub shaft (8) and the connecting shaft (1),
  the connecting shaft (13) being supported in the gas turbine housing via a first bearing unit (6), and
  the stub shaft (8) being supported in the gas turbine housing via a second bearing unit (7), characterised in that
  the disassembly method comprises at least the steps of:
a) dismounting the fan module (1), and
b) fixing the N1 shaft (10) in an axial direction relative to the gas turbine housing using a fixing device (14), and
c) dismounting the stub shaft (8) using a guide device (15), the orientation of which relative to the gas turbine (11) in at least one spatial direction is determined by a component of the remaining gas turbine (11), this taking place after the N1 shaft (10) has been fixed and after the fan module (1) has been dismounted.

Embodiment 2

Disassembly method according to Embodiment 1, characterised in that
  the method step b) comprises at least the method steps of:
d) dismounting an exhaust gas cone, and then
e) mounting a fixing device (14) in the location of the exhaust gas cone, and then
f) connecting the N1 shaft (10) to the fixing device (14).

Embodiment 3

Disassembly method according to any of the preceding Embodiments, characterised in that
  the method step c) comprises at least the method steps of:
g) releasing all the connections between the stub shaft (8) and the N1 shaft (10), and then
h) releasing all the connections between the stub shaft (8) and the connecting shaft (13) and then
i) fitting a press device for axially separating the N1 shaft (10) from the stub shaft (8), the press device being connected both to the N1 shaft (10) and to the stub shaft (8), and then
j) introducing a force into the stub shaft (8) and into the N1 shaft (10) via the press device, which is oriented such that the stub shaft (8) and the N1 shaft (10) are moved apart in the axial direction.

Embodiment 4

Disassembly method according to Embodiment 3, characterised in that,
  as an additional method step,
k) the stub shaft (8) is supported in the radial direction by the guide device (15) during the axial forward dismounting movement.

Embodiment 5

Disassembly method according to Embodiment 4, characterised in that
  the guide device (15) is attached to a gas turbine housing of the low-pressure compressor (4).

Embodiment 6

Disassembly method according to any of the preceding Embodiments, characterised in that,
  in method step c), the stub shaft (8) and the low-pressure compressor (4) are dismounted.

Embodiment 7

Disassembly method according to Embodiment 6, characterised in that,
  in method step c), the first bearing unit (6) and the connecting shaft (13) are also dismounted, this taking place after the low-pressure compressor has been dismounted.

Embodiment 8

Disassembly method according to Embodiment 7, characterised in that,
  following the method steps a) to c), an additional method step l) is provided for replacing at least one sub-system of a sensor system (45).

Embodiment 9

Disassembly method according to Embodiment 8, characterised in that
  the method step l) also includes the calibration of the sensor system (45),
  the sensor system substantially comprising a sensor and a clock generator (33),
  the distance between a clock generator (33) and a sensor head being measured during calibration using a calibration device (16).

Embodiment 10

Disassembly method according to Embodiment 9, characterised in that
the calibration device (16) is arranged on the second bearing unit (7).

Embodiment 11

Disassembly method according to any of Embodiments 1 to 9, characterised in that,
in method step c), the second bearing unit (7) is also dismounted.

Embodiment 12

Fixing device (14) for carrying out the disassembly method according to any of Embodiments 1 to 11, comprising
a fixing rod (17) for connecting the N1 shaft (10) to the fixing device (14), and
a centring plate (18) for fixing the fixing rod (17), said plate being held in a defined position by a part of the gas turbine (11), wherein
at least one attachment means (19) is provided on the centring plate (18), said attachment means being capable of attaching the centring plate (18) to the gas turbine (11) in place of the exhaust gas cone.

Embodiment 13

Guide device (15) for carrying out the disassembly method according to either Embodiment 4 or Embodiment 5 or according to any of Embodiments 6 to 11, when dependent on either Embodiment 4 or Embodiment 5, wherein
the guide device (15) comprises a retaining device (20) which can be connected to a front part of the gas turbine (11) and
a guide pipe (21), wherein,
when mounted, the guide pipe (21) is supported by a central hole (22) in the retaining device (20), wherein the guide pipe (21) comprises a thread (44) at one end for connection to the N1 shaft (10).

Embodiment 14

Calibration device (16) for carrying out the disassembly method according to either Embodiment 9 or Embodiment 10, wherein
the calibration device (16) comprises a first and second outer face (23, 24), wherein
the radius of the first outer face (23) corresponds to the radius of a clock generator (33) of a sensor system, and
the second outer face (24) corresponds in shape to the inner face (25) of the second bearing unit (7).

Embodiment 15

Calibration device (16) for carrying out the disassembly method according to Embodiment 14, characterised in that
the calibration device (16) comprises at least one annular projection (26), wherein
at least one gap (27) is provided in the annular projection (26) in order to make it easier to move the calibration device (16) into/out of the calibration position.

The invention claimed is:

1. A method for disassembling a gas turbine, comprising:
providing a fixing device;
providing a guide device;
providing a gas turbine,
wherein the gas turbine comprises:
a fan module;
a gas turbine housing;
a low-pressure system; and
a high-pressure system,
wherein the low-pressure system comprises:
a low-pressure compressor;
a low-pressure turbine;
a connecting shaft;
a stub shaft; and
an N1 shaft,
wherein the N1 shaft is connected to the low-pressure compressor via the stub shaft and the connecting shaft,
wherein the connecting shaft is supported in the gas turbine housing via a first bearing unit, and
wherein the stub shaft is supported in the gas turbine housing via a second bearing unit;
dismounting the fan module;
fixing the N1 shaft in an axial direction relative to the gas turbine housing using the fixing device; and
dismounting the stub shaft using the guide device,
wherein an orientation of the guide device relative to the gas turbine housing in at least one spatial direction is determined by a component of a portion of the gas turbine not yet dismounted,
wherein dismounting the stub shaft using the guide device comprises dismounting the stub shaft after fixing the N1 shaft in the axial direction relative to the gas turbine housing using the fixing device and after dismounting the fan module.

2. The method according to claim 1,
wherein the gas turbine further comprises:
an exhaust gas cone,
wherein fixing the N1 shaft in the axial direction relative to the gas turbine housing using the fixing device comprises:
dismounting the exhaust gas cone from a location of the exhaust gas cone; and then
mounting the fixing device in the location of the exhaust gas cone; and then
connecting the N1 shaft to the fixing device.

3. The method according to claim 1, further comprising:
providing a press device,
wherein dismounting the stub shaft using the guide device comprises:
releasing all connections between the stub shaft and the N1 shaft; and then
releasing all connections between the stub shaft and the connecting shaft; and then
fitting the press device,
wherein fitting the press device comprises:
connecting the press device to the N1 shaft; and
connecting the press device to the stub shaft; and then
applying a first force to the stub shaft via the press device; and
applying a second force opposite to the first force to the N1 shaft via the press device, wherein the first force and the second force are oriented such that the stub shaft and the N1 shaft are moved apart in the axial direction relative to the gas turbine housing.

4. The method according to claim 3, further comprising: supporting the stub shaft in a radial direction relative to the gas turbine housing via the guide device while applying the first force to the stub shaft via the press device and applying the second force opposite to the first force to the N1 shaft via the press device.

5. The method according to claim 4, wherein supporting the stub shaft in the radial direction relative to the gas turbine housing via the guide device while applying the first force to the stub shaft via the press device and applying the second force opposite to the first force to the N1 shaft via the press device comprises attaching the guide device to a front part of the gas turbine housing while applying the first force to the stub shaft via the press device and applying the second force opposite to the first force to the N1 shaft via the press device.

6. The method according to claim 5, wherein dismounting the stub shaft using the guide device comprises dismounting the stub shaft and dismounting the low-pressure compressor.

7. The method according to claim 1, wherein dismounting the stub shaft using the guide device comprises dismounting the stub shaft and dismounting the low-pressure compressor.

8. The method according to claim 7, wherein dismounting the stub shaft using the guide device further comprises dismounting the first bearing unit and dismounting the connecting shaft, and wherein dismounting the first bearing unit and dismounting the connecting shaft comprises dismounting the first bearing unit and dismounting the connecting shaft after dismounting the low-pressure compressor.

9. The method according to claim 8, wherein the gas turbine further comprises:
a sensor system,
wherein after:
dismounting the fan module;
fixing the N1 shaft in the axial direction relative to the gas turbine housing using the fixing device; and
dismounting the stub shaft using the guide device,
further comprising:
replacing at least one sub-system of the sensor system.

10. The method according to claim 9, further comprising: providing a calibration device,
wherein replacing the at least one sub-system of the sensor system comprises:
calibrating the sensor system,
wherein the sensor system comprises a sensor and a clock generator, and
wherein calibrating the sensor system comprises measuring a distance between the clock generator and a sensor head of the sensor via the calibration device.

11. The method according to claim 10, wherein measuring the distance between the clock generator and the sensor head of the sensor via the calibration device comprises arranging the calibration device on the second bearing unit while measuring the distance between the clock generator and the sensor head of the sensor via the calibration device.

12. The method according to claim 11, wherein dismounting the stub shaft using the guide device comprises dismounting the second bearing unit.

13. The method accordingly to claim 10, wherein the calibration device comprises:
a first outer face; and
a second outer face,
wherein the calibration device is configured to calibrate the sensor system via measuring a distance between the clock generator and a sensor head of the sensor,
wherein a radius of the first outer face corresponds to a radius of the clock generator of the sensor system, and
wherein the second outer face corresponds in shape to an inner face of the second bearing unit.

14. The calibration device according to claim 13, wherein the calibration device is configured to measure the distance between the clock generator and the sensor head of the sensor when arranged on the second bearing unit.

15. The calibration device according to claim 13, wherein the calibration device comprises an annular projection,
wherein at least one gap is provided in the annular projection,
wherein the at least one gap provided in the annular projection allows the calibration device to move past obstacles when the calibration device is moved into and/or out of a calibration position.

16. The method according to claim 1, wherein dismounting the stub shaft using the guide device comprises dismounting the second bearing unit.

17. The method according the claim 1, wherein the fixing device comprises:
a fixing rod; and
a centering plate,
wherein the fixing rod is configured to connect the N1 shaft to the fixing device,
wherein the centering plate is configured to fix the fixing rod, such that the centering plate is held in a defined position by a part of the gas turbine,
wherein the centering plate comprises at least one connector, and
wherein the at least one connector is configured to, after an exhaust gas cone of the gas turbine is dismounted from a location of the exhaust gas cone, attach the centering plate to the gas turbine in the location of the exhaust gas cone, and
wherein the guide device comprises:
a retraining device; and
a guide pipe,
wherein the retaining device is configured to be connected to a front part of the gas turbine housing,
wherein when the guide pipe is mounted, the guide pipe is supported by a central hole in the retaining device,
wherein the guide pipe comprises a thread,
wherein the thread is at one end of the guide pipe, and
wherein the guide pipe is configured to connect to the N1 shaft via the thread.

18. The method according to claim 1, wherein the fixing device comprises:
a fixing rod; and
a centering plate,
wherein the fixing rod is configured to connect the N1 shaft to the fixing device,
wherein the centering plate is configured to fix the fixing rod, such that the centering plate is held in a defined position by a part of the gas turbine,
wherein the centering plate comprises at least one connector, and wherein the at least one connector is configured to, after an exhaust gas cone of the gas turbine is dismounted from a location of the exhaust gas cone, attach the centering plate to the gas turbine in the location of the exhaust gas cone.

19. The method according to claim 1,
wherein the guide device comprises:
a retaining device; and
a guide pipe,
wherein the retaining device is configured to be connected to a front part of the gas turbine housing,
wherein when mounted, the guide pipe is supported by a central hole in the retaining device,
wherein the guide pipe comprises a thread at one end, and
wherein the guide pipe is configured to connect to the N1 shaft via the thread.

20. The method according to claim 19,
wherein dismounting the stub shaft using the guide device comprises:
    releasing all connections between the stub shaft and the N1 shaft; and then
    releasing all connections between the stub shaft and the connecting shaft; and then
    fitting a press device,
    wherein fitting the press device comprises
        connecting the press device to the N1 shaft; and
        connecting the press device to the stub shaft; and then
    applying a first force to the stub shaft via the press device; and
    applying a second force opposite to the first force to the N1 shaft via the press device,
    wherein the first force and the second force are oriented such that the stub shaft and the N1 shaft are moved apart in the axial direction,
wherein the guide device is configured to support the stub shaft in a radial direction relative to the gas turbine housing while applying the first force to the stub shaft via the press device and applying the second force opposite to the first force to the N1 shaft via the press device.

* * * * *